United States Patent
Vergnes et al.

(10) Patent No.: US 7,669,072 B2
(45) Date of Patent: Feb. 23, 2010

(54) CLOCK CIRCUITRY ARCHITECTURE TO IMPROVE ELECTRO-MAGNETIC COMPATIBILITY AND OPTIMIZE PEAK OF CURRENTS IN MICRO-CONTROLLER

(75) Inventors: Alain Vergnes, Trets (FR); Ludovic Dupre, Nimes (FR); David Dumas, aix en Provence (FR)

(73) Assignee: Atmel Corporation, San Jose, CA (US)

( * ) Notice: Subject to any disclaimer, the term of this patent is extended or adjusted under 35 U.S.C. 154(b) by 556 days.

(21) Appl. No.: 11/668,978

(22) Filed: Jan. 30, 2007

(65) Prior Publication Data

US 2008/0183924 A1    Jul. 31, 2008

(51) Int. Cl.
G06F 1/04 (2006.01)
G06F 1/14 (2006.01)

(52) U.S. Cl. .................. 713/503; 713/500; 713/501; 713/502

(58) Field of Classification Search ............. 713/500, 713/501, 502, 503
See application file for complete search history.

(56) References Cited

U.S. PATENT DOCUMENTS

| | | | |
|---|---|---|---|
| 5,675,832 A * | 10/1997 | Ikami et al. ............ 713/600 |
| 6,275,068 B1 | 8/2001 | Kermani et al. |
| 6,289,468 B1 | 9/2001 | Godfrey |
| 7,477,068 B2 * | 1/2009 | Truong et al. ............ 326/27 |
| 2004/0056699 A1 * | 3/2004 | Truong et al. ............ 327/258 |
| 2005/0218953 A1 | 10/2005 | Slawecki |

FOREIGN PATENT DOCUMENTS

| WO | WO-2008094961 A2 | 8/2008 |
|---|---|---|
| WO | WO-2008094961 A3 | 8/2008 |

OTHER PUBLICATIONS

"International Application Serial No. PCT/US2008/052391, Search Report and Written Opinion mailed Jul. 14, 2008" 10 pages.

* cited by examiner

*Primary Examiner*—Thomas Lee
*Assistant Examiner*—James Henson
(74) *Attorney, Agent, or Firm*—Schwegman, Lundberg & Woessner, P.A.

(57) ABSTRACT

A system comprises a central processing unit and a set of peripheral units accessible by the CPU and being able to be driven by the same clock source. At least one programmable delay line is located in the clock branch of one of the peripheral units and has a delay selection input that is accessible by software running on the system.

16 Claims, 9 Drawing Sheets

THIS WILL BE FIGURE 3 FROM PAGE 13 OF THE DISCLOSURE

US 7,669,072 B2

CLOCK CIRCUITRY ARCHITECTURE TO IMPROVE ELECTRO-MAGNETIC COMPATIBILITY AND OPTIMIZE PEAK OF CURRENTS IN MICRO-CONTROLLER

BACKGROUND OF THE INVENTION

1. Field of the Invention

The present invention relates to digital logic systems employing combinatorial and sequential logic, such as micro-controller systems. More particularly, the present invention relates to a clock circuitry architecture that employs tunable variable delays for use in such systems.

2. The Prior Art

To improve the effectiveness of micro-controller systems with respect to the volume of information to be processed, co-processor modules are connected the central processing unit through the internal system bus. The co-processor modules can be accessed for configuration, sending commands/data, and can be interrogated for status.

All of the modules of a micro-controller are often clocked by the same clock signal, causing a peak in the power consumption for each active edge of the clock signal due to the switching of sequential cells and to the combinational logic networks driven by the sequential cells.

Referring now to FIG. 1, a block diagram shows an example of a system comprising a crypto-processor connected in a micro-controller environment. The system includes a microprocessor 10 capable of executing a set of instructions that can be stored outside the integrated circuit in a memory device which is controlled by an external bus interface (EBI) 12 or located in a ROM or embedded flash acting as an on-chip memory 14. An address decoder module 16 is used to select one module from among all possible modules/peripherals connected in parallel of the same system bus. The system bus includes an address bus 18, a write data bus 20, a read data bus 22 and a read/write control signal 24. The data on the read data bus 22 is generated by a data multiplexer 26 collecting data from EBI interface 12, on-chip memory 14, crypto-processor 28, UART 30, and CAN controller 32. Clock terminal 34 supplies clock signals to all the components and reset terminal 36 may be used to initialize all the components as is known in the art. Similarly, power supply terminals $V_{DD}$ 38 and GND 40 supply power to all of the components, which are formed from CMOS logic elements.

The microprocessor 10 executes instructions that can be stored outside the chip by setting a value on address bus 18 corresponding to EBI interface 12. The address decoder 16 asserts the corresponding selection signal to EBI interface 12 on line 42. To fetch the instruction, the read/write control signal on control line 24 of the system bus is asserted for read operation mode. The value can be either logical 1 or 0 depending on the system bus protocol. The EBI interface 12 drives the external memory device accordingly to obtain the data required by the microprocessor 10. The instruction to execute is asserted on the EBI data bus 44 by the EBI interface 12, the data multiplexer 26 places the value from EBI data bus 44 on the system read data bus 22. Thereafter, the microprocessor 10 is ready to execute the instruction.

If the instruction is a write instruction to one of the modules connected in parallel on the system bus, the microprocessor 10 performs another similar fetch to obtain the destination address where the data must be written. As soon as all the data are known by the microprocessor 10, it executes a write instruction to the selected peripheral by asserting the system address bus 18 with a value selecting (for example) the crypto-processor module 28. The address decoder 16 deselects the EBI interface 12 by clearing the associated selection signal on line 42 and asserts the selection signal 46 corresponding to the crypto-processor module 30.

Being selected for a write operation, the crypto-processor module 28 writes into its internal registers the value of write data bus 20. The other modules 12, 14, 30, 32, and 34 also receive this value but do not take any action because they are not selected.

The instructions are sequentially executed and perform read or write operations on the system bus for any peripheral connected on the system bus. The microprocessor 10 can also be triggered by a peripheral with the interrupt line 48. This interruption line is driven by the interrupt controller 50, which handles the priorities of the interrupt lines 52, 54, and 56 coming from peripheral modules 28, 30, and 32. For example if the expected result from a peripheral is known to have a large clock cycle latency, it is better to trigger the interrupt line rather than waiting for the result with some kind of no-operation instruction especially when several peripherals have large latency response times (e.g., UART, ETHERNET MAC, CAN, LIN). The software application code would be difficult to generate without interrupt handling in a micro-controller system having several modules with different latencies.

When one of the peripheral modules is accessed and/or is processing data provided by the CPU, the power consumption increases on the power supply lines 38 and 40. This current is due to sequential cell switching, the combinational cell switching and also to the PAD buffer switching (e.g., I/O pads 58 (RXD), 60 (TXD), or 62 (CAN bus)) when the CPU drives a communication peripheral such as UART 30 or CAN controller 32. When several peripherals are used, the total power consumption current is the sum of power consumption current of each peripheral. The average power consumption depends on how many peripherals are used by the user software application and the manner in which they are used.

A peripheral can often be configured to process data in different ways. For example a UART may be configured to transfer a character of different length (6,7,8-bit) including or not the parity bit, or may simply transfer different data on the RS232 line. The resulting waveform of the power consumption current will be different for each of these instances. A crypto-processor module 28 may be configured to perform a crypto algorithm by, for example, using different key length (AES 128, 192, 256), resulting in a slightly different waveform of the power consumption current.

Referring now to FIG. 2, a block diagram shows a generic example of a digital peripheral device. As is well known to persons of ordinary skill in the art, a synchronous digital peripheral is formed from sequential and combinational cells. A digital peripheral may be seen as a series of combinatorial logic networks driven by primary inputs and/or other combinatorial logic networks and/or sequential cell outputs. In the example of FIG. 2, clock pad 62 drives the clock input of D-flip-flop (DFF) 64 via buffer 66. The output of DFF 64 is fed back to its data input through combinatorial logic 68. The output of DFF 64 is also presented to combinatorial logic 68. The output of combinatorial logic network 70 drives pad buffer 72.

The current consumption of digital peripheral device 60 can be divided in three main components. The first component is the current consumption from the clock tree at clock pad 62, clock nets at the input and output of buffer 66, and the clock inputs of sequential cells such as the DFFs/latches 64. Whatever the use of the peripheral, the waveform current consumption from the clock tree is constant as soon as the clock input terminal 52 begins switching.

The second component is the output switching of the DFF 64 producing a current consumption in combinatorial logic networks 68 and 70 whose peak value depends on the data processed by the peripheral. If there is no toggling at the clock input terminal 62 there is no current consumption in combinational logic networks 68 and 70.

The third component is the switching current due to the pad buffer 72. If there is no toggling at the clock input terminal 62 there is no current consumption in pad buffer 72. The peak current in pad buffer 72 is often higher than the peak current in combinatorial logic networks 68 and 70 because the transistors used in this kind of buffer are oversized to drive external lines with big capacitance and may be big loads (low resistive load). When providing a communication protocol (UART, LIN, CAN) to an external line, the current in the pad buffer 72 does not exist for each clock cycle on clock input pad 62, but rather depends on the protocol itself and/or the data value transferred.

A series of waveforms showing an example of current consumption of a digital communications peripheral is shown in FIG. 3. This waveform is not extracted from an actual simulation but rather provides an idea of the current shapes.

The current in combinatorial logic networks 68 and 70 may vary from cycle to cycle depending on the algorithm processed and/or the configuration used for a peripheral. For example an UART may be configured to transfer 8 bits of data with or without a parity bit. The parity bit may be calculated in serial mode (for each bit time, a 1 bit counter is toggling according to the transmitted bit value) or in parallel using more combinatorial cells (XOR) to compute parity when the data to transmit is loaded into a register, resulting in a different power consumption current. When a parity bit is transmitted, certain architectures (parallel) may give a current peak higher than that of the serial case. This may be a source of difference in shapes of the current from clock cycle to clock cycle.

Referring now to FIG. 4, a block diagram shows a multi-stage logic network 80, Logic network 80 is merely illustrative and has DFFs 84, 86, 88, and 90 as inputs. A first stage includes AND gate 90, and inverters 92 and 94. A second stage includes AND gate 96, and OR gates 98 and 100. A third stage includes OR gate 102 and AND gate 104. A fourth stage includes inverters 106 and 108. A fifth stage includes DFFs 110 and 112. FIG. 5 is a series of waveforms that show the current consumption of the circuit of FIG. 4 as a function of time.

From an examination of FIGS. 4 and 5, it may be seen that the maximum duration of the current pulse for combinatorial logic networks is defined by the number of cell stages in these networks. Each logic cell has an intrinsic propagation delay. Therefore the overall power consumption current is the sum of all cell currents, each stage in the network generating a pulse delayed from the previous one by the intrinsic propagation delay. Because each level has different types of cells, the intrinsic delay is different and the overall power consumption current of such combination network looks like a pulse. After the last stage switch, the overall current decreases.

In a synchronous module such as one in which DFFs are sampling the outputs of combinational networks, the active edge of the clock must be located after the switching of the last stage of the combinational network has completed. This must be calculated in the worst-case condition of the circuit (i.e., process, temperature, voltage, etc.). Therefore the maximum propagation delay of combinational networks is the main factor in calculating the maximum frequency at which the circuit may be clocked.

The current consumed by the operation of a peripheral (or any kind of logic) generates voltage drops in internal power supply lines of the integrated circuit. A part of the voltage drop is due to the resistivity of the power supply lines, the more important the current peak is, the more voltage drop down occurs.

Another factor of noise on lines is the current slew rate. The more current is switched in a given period of time (also known as "di/dt"), the more parasitic voltage is created on internal/external power supply lines. These parasitic voltages occur due to the inductive factor of the power supply lines and on any internal net able to toggle from logical 0 to 1 and vice versa. On power supply lines, the current is much higher than on an internal single control/command net driving several inputs of cells. The power supply lines are also capacitive, and, when logic is switching, the induced voltage parasitic induced can propagate on the power supply lines of the integrated circuit and may interfere with the other circuits powered on the same supply of the printed circuit board.

Yet another potential source of interference is the electromagnetic propagation that may occur due to different lengths of internal nets such as power supply lines, in combination with different parasitic capacitors and inductances. For some application, especially the automotive market, the electromagnetic compatibility is a key factor. Therefore, to improve the electromagnetic compatibility, the current slope must be reduced.

To reduce the current slope, two factors may be adjusted: the current peak value or the time required to process the data. The second factor may not easy to adjust because it partially depends on the architecture of the logic of the particular peripherals embedded in the micro-controller. Once manufactured, it is no longer possible to modify it. The logic architecture can be designed so that there is less combinational logic between the DFFs, leading to less power consumption current in the logic. Such a solution, however, requires more DFFs to obtain the equivalent function, resulting in higher power consumption current and a larger number of clock cycles to perform the data processing. Such solutions may degrade some functions of the logic (maximum baud rate of an UART, minimum throughput of a crypto-processor, etc.).

The first factor, peak value of the current, (di) can be optimized. The peak value of power consumption current, as described in FIG. 3 results of the addition of several currents. If a single peripheral is processing data into a micro-controller it is difficult to get improvement in di/dt (current slope) because the architecture of the peripheral logic is pre-determined.

If the peripheral is a communication peripheral it is possible to delay the current pulse due to PAD switching and therefore prevent the peak current of the core logic from occurring at the same time as the peak current of the pad buffer. Even if theses currents are internally carried by different power supply lines (pad ring power supply rails are independents of core power supply lines, separated terminals are defined for both), all power supply package pins of the circuit may be connected together on the printed circuit board, outside the integrated circuit. In such case, the currents may add together and create a larger di/dt with the described consequences in terms of electromagnetic compatibility (EMC) at the printed circuit board level.

One method of improving the EMC characteristics of digital systems is to introduce a fixed delay (formed from, e.g., cascaded buffer cells or inverters cells) between the output of the peripheral logic and the input of the PAD buffer. One drawback of this method is that the delay value may not be optimal for all cases of use. Depending on the frequency of the clock driving the communication peripheral, the delay to obtain the optimal value of electromagnetic compatibility and/or minimum voltage drop in lines may be different for each operating frequency. This is especially true when the micro-controller is able to use a wide range of clock frequencies. For example, micro-controllers for the automotive market may operate in a range of from 8 MHz to 50 MHz.

By unbalancing the terminal clock of each module of the micro-controllers, the current peaks of the modules may add together in a less destructive manner for EMC, resulting in a limited current peak compared to a full balanced clock circuit. This is true for the peak current due to sequential cells, but the shape of the current resulting from the combinational logic is more complex and a fixed unbalancing may result to higher current peaks. Fixed unbalancing of internal clocks of same frequency is used especially in some integrated circuits for the automotive market where the electromagnetic compatibility must be improved but the unbalancing delay is limited by the maximum acceptable clock frequency of the circuit. The lower the clock frequency, the larger the clock period, therefore delay margins are larger at low frequencies and higher unbalancing may be performed.

Therefore there is a need for adjustable delay to guaranty optimal EMC compatibility whatever the clock frequency is. A programmable level of adjustable delay to provide internal clock balancing that may be programmed by any means including terminal inputs of the circuit or user configurable registers would be particularly useful.

BRIEF DESCRIPTION OF THE INVENTION

The present invention comprises clock architectures and methods that provide programmable/configurable delays for clock unbalancing. These delays may be configured through the user interface of each module or may be automatically modified according to the system clock frequency. The maximum unbalanced internal clock can be achieved when the system clock is set at a low frequency compared to the maximum acceptable clock frequency of the micro-controller. The maximum balancing must be done when the system clock is turned to a frequency close or equal to the maximum acceptable clock frequency of the micro-controller.

According to one aspect of the invention, an adjustable delay is added between CPU peripheral logic and PAD buffer.

According to another aspect of the present invention, two adjustable delays are provided.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

The present invention finds application in the area of micro-controller integrated circuit devices but can be used in any other type of circuits where digital logic modules are embodied. The present invention may be advantageously employed in a crypto-processor digital module but can be used in any other digital module. Crypto-processor modules can be mainly found in micro-controller integrated circuits but also in any other type of integrated circuits. The disclosure of the present invention will be given for the illustrative example of a micro-controller, but persons of ordinary skill in the art will readily understand from the present disclosure how the invention may be employed in other systems.

Figure 6:
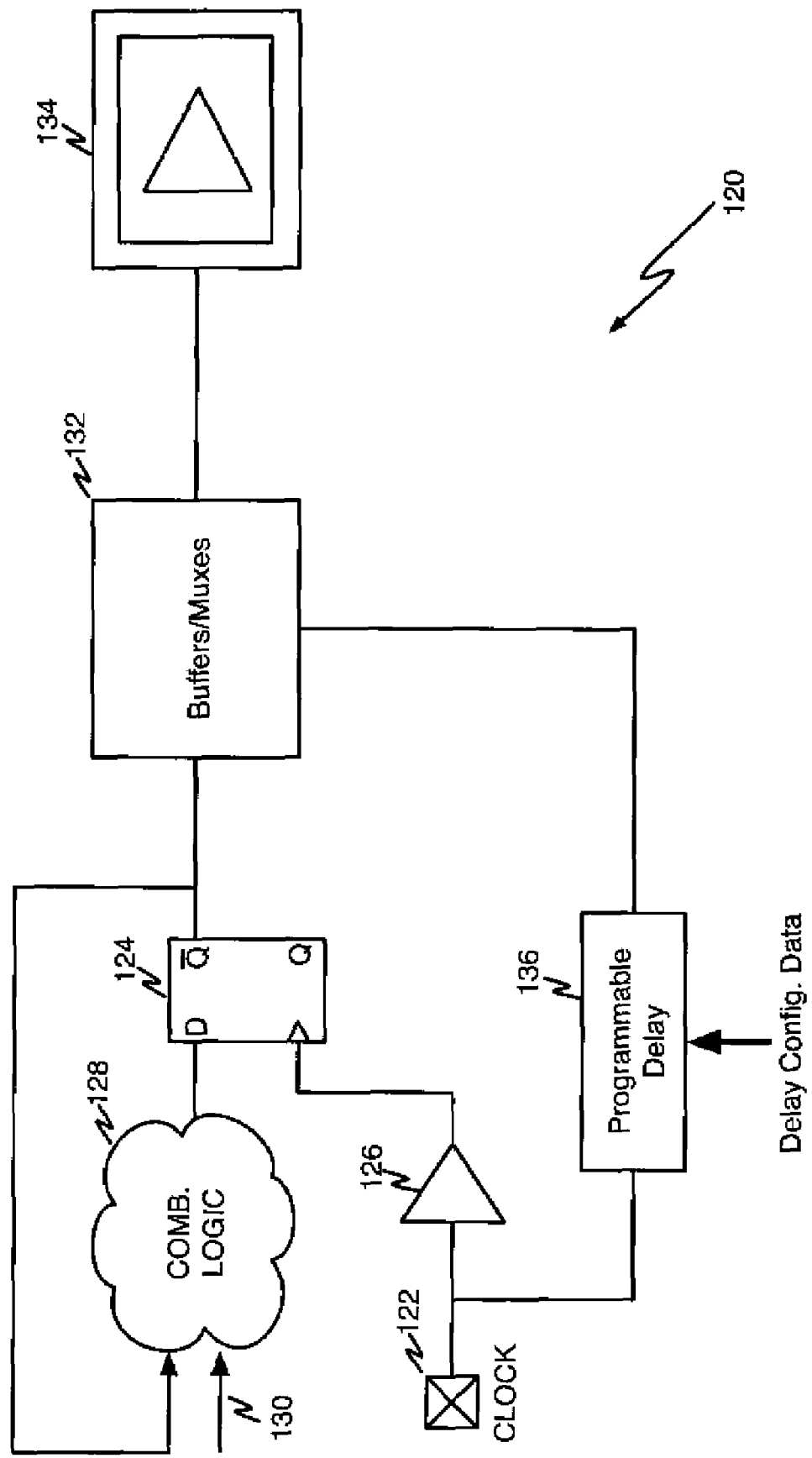
FIG. 6 is a block diagram illustrating the use of programmable clock delay according to the present invention.

Referring now to FIG. 6, a block diagram illustrates the use of a programmable clock delay according to the present invention. Logic circuit 120 is fed by clock terminal 122 to drive the clock input of DFF 124 through buffer 126. The output of DFF 124 is presented to combinatorial logic 128 along with primary inputs 130. The output of DFF 124 is also presented to buffers/multiplexers 132. The output of buffers/multiplexers 132 drives pad buffer 134. The clock signal used to drive buffers/multiplexers 132 is derived from clock terminal 122 through programmable delay 136. Programmable delay 136 may be programmed with delay configuration data as disclosed herein.

Figure 7:
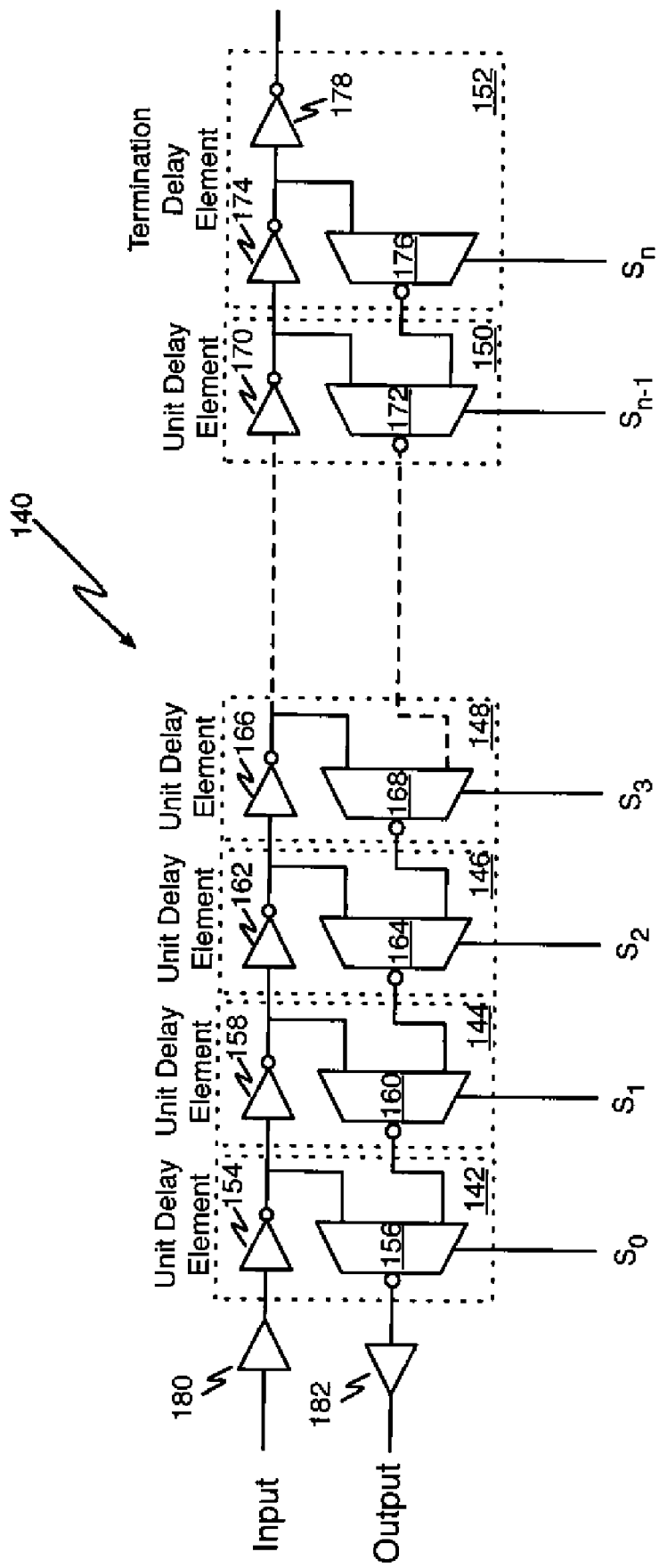
FIG. 7 is a block diagram of an illustrative programmable delay circuit that may be employed in the present invention.
Figure 10:
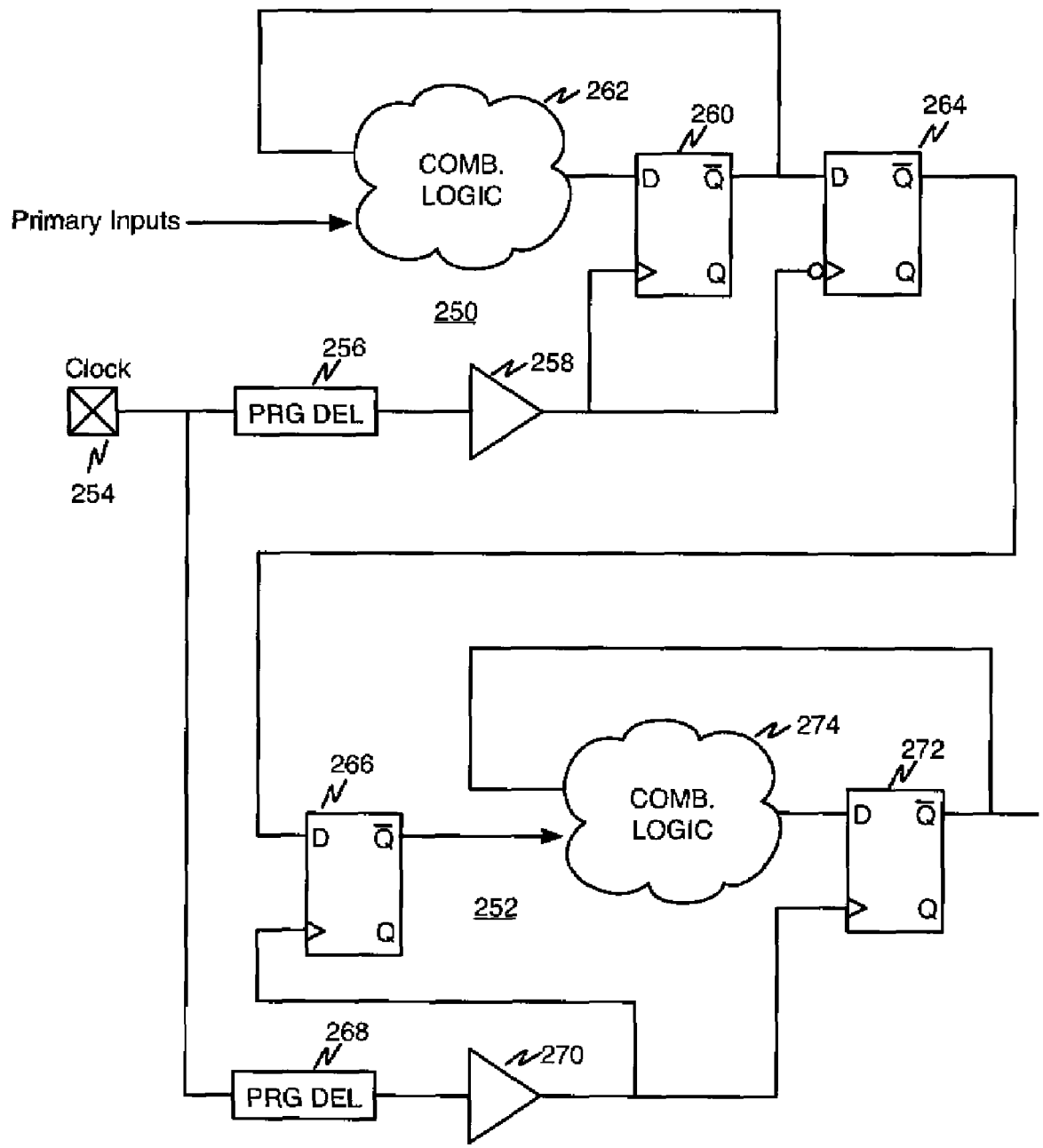
FIG. 10 is a block diagram illustrating a data exchange architecture circuitry that may be employed in the present invention to face unbalanced clock.

Different methods exist to generate a programmable delay. Referring now to FIG. 7, an illustrative programmable delay line circuit 140 is shown. The illustrative programmable delay line circuit 140 in FIG. 10 is shown having a plurality of cascaded unit delay elements 142, 144, 146, 148, 150, and 152. Each unit delay element includes an inverter and a multiplexer. The inverter of each unit delay element being cascaded with the inverter of the next unit delay element and the multiplexer of each unit delay element has one input cascaded with the inverter of the previous unit delay element. Thus unit delay element 142 includes inverter 154 and multiplexer 156; unit delay element 144 includes inverter 158 and multiplexer 160; unit delay element 146 includes inverter 162 and multiplexer 164; unit delay element 148 includes inverter 166 and multiplexer 168; unit delay element 150 includes inverter 170 and multiplexer 172; unit delay element 152 includes inverter 164 and multiplexer 166. The purpose of inverter 178 is to balance the capacitive load for each stage of the programmable delay line and therefore it balances the propagation delay of each stage. An input buffer 180 and an output buffer 182 are provided.

Multiplexers 156, 160, 164, 168, 172, and 176 are controlled by switching inputs $S_0$, $S_1$, $S_2$, $S_3$, ... $S_{(n-1)}$ and $S_{(n)}$, respectively. If the select of a unit delay element is set to logic zero, its multiplexer selects the inverted output of the multiplexer in the next unit delay element. If the select of a unit delay element is set to logic one, its multiplexer selects the output of its own inverter. Thus, only one select input in the programmable delay line circuit 140 need be set to logic one, in which unit delay element the signal is turned around and is directed back down through the chain of multiplexers and ultimately to the output buffer 182. Any select input further downstream in the chain that is set to logic one does not affect the operation of the programmable delay line circuit 140. The data to provide to select inputs $S_0, S_1, S_2, S_3, \ldots S_{(n-1)}$ and $S_{(n)}$ may be provided by the microprocessor and stored in registers for use by delay line circuit 140.

As an example, if the select inputs $S_0$ and $S_1$ are set to logic zero and the select input $S_2$ is set to logic one, the signal will pass through the input buffer 180, inverters 154, 158 and 162, multiplexers 164, 160 and 156, and through output buffer 182. The states of select inputs $S_3, \ldots S_{(n-1)}$ and $S_{(n)}$ will not affect the operation of the circuit.

Figure 8:
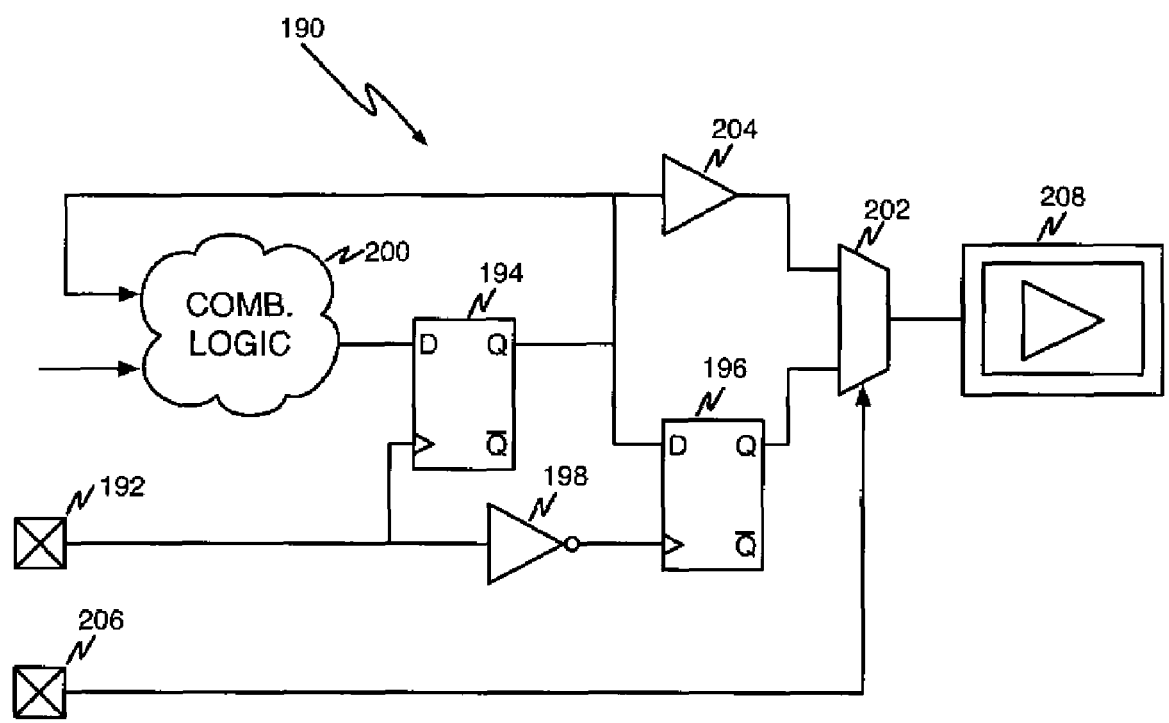
FIG. 8 is a block diagram illustrating the use of two selectable programmable delays according to the present invention.

Referring now to FIG. 8, another programmable delay architecture according to the present invention allows the selection of two delays. This feature of the invention is shown embodied in peripheral circuit 190. Clock terminal 192 drives a clock signal to the clock input of DFF 194 and the clock input of DFF 196 through inverter 198. The Q output of clock input of DFF 194 drives the data input of DFF 196 as well as one input of combinatorial logic 200. Multiplexer 202 has a first data input driven by the output of DFF 194 through buffer 204 and a second data input driven from the output of DFF 194. Buffer 204 may be a programmable delay line such as the one depicted in FIG. 7. The select input of multiplexer 202 is driven from input terminal 206. This terminal is accessible by the software to set the selected delay. The output of multiplexer 202 drives pad buffer 208.

The first delay is provided by the buffer 204 and the second delay is provided by the fact that DFF 196 is clocked on the falling edge of the clock through inverter 198. The second delay is therefore equivalent to a signal that would be driven by a rising edge DFF followed by a number of cascaded buffers that would provide a ½ clock period propagation delay, except that the circuit of FIG. 8 provides a ½ clock-period delay using a single cell and it is independent of the clock frequency.

Although the disclosure of the invention has to this point focused on providing programmable clock delay for a single peripheral device, the present invention is applicable to systems employing more than one peripheral. When several peripherals are used, especially if they do not communicate with pad buffers, the only currents to take into account are the currents due to the core logic.

To optimize dynamic power consumption it is preferable to be able to disable the clock for each peripheral when it is not in use. With respect to any software application, the dynamic power consumption will be optimal because the unneeded peripherals will have their dynamic power consumption reduced to zero. But when several peripherals are in use and their associated clock trees are enabled, it is still possible to optimize the EMC and/or the maximum peak current by adding delays in the clock trees of each peripheral clock by using the principles of the present invention.

The current consumption waveform shapes from each peripheral may be different and the addition of these currents may lead to complex overall current waveforms. In the following example, only three peripherals are taken into account for better comprehension but the problem is similar for any number of peripherals.

Figure 1:
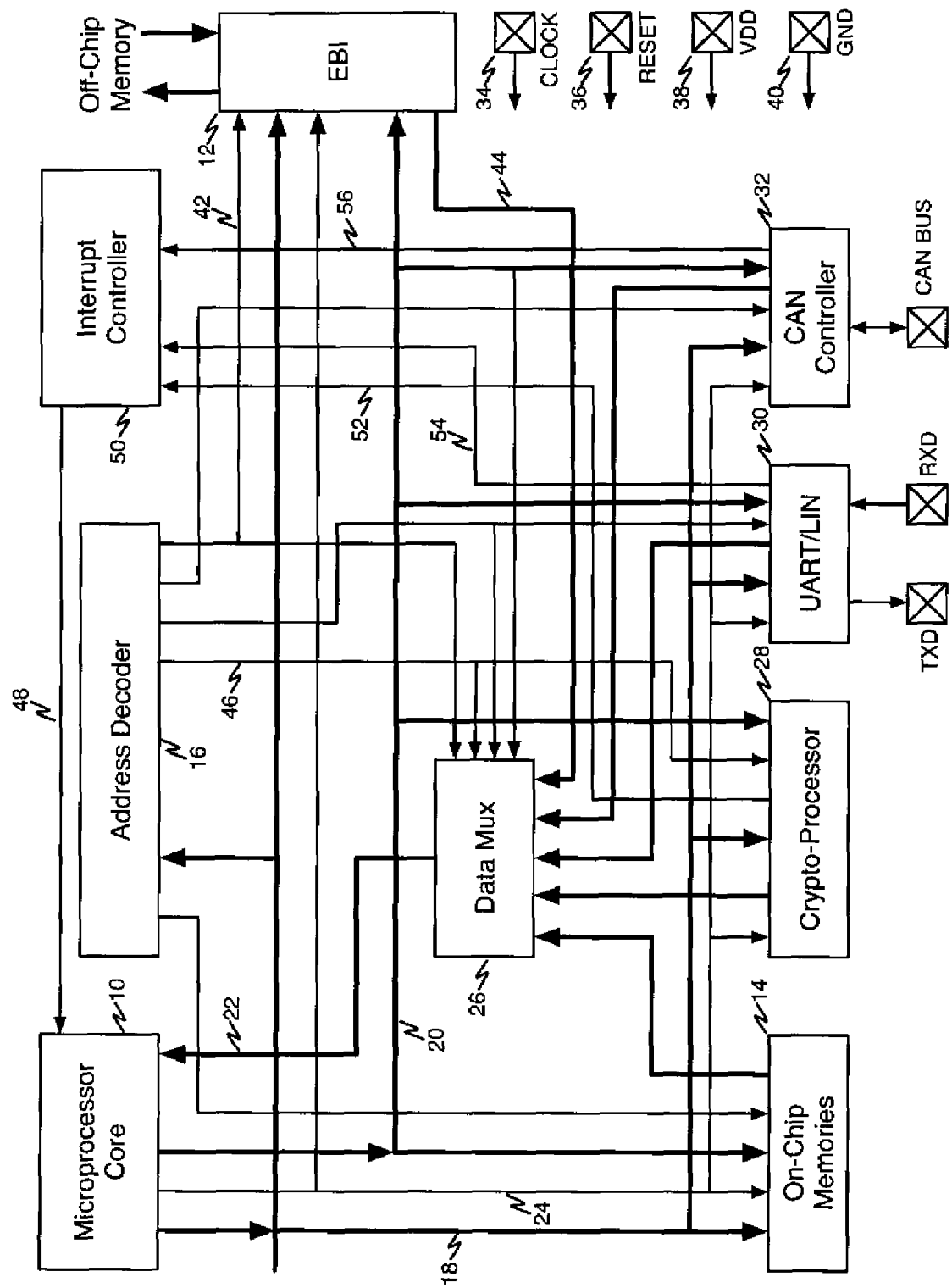
FIG. 1 is a block diagram of a typical microcontroller architecture, showing an illustrative environment in which the present invention may be employed.
Figure 2:
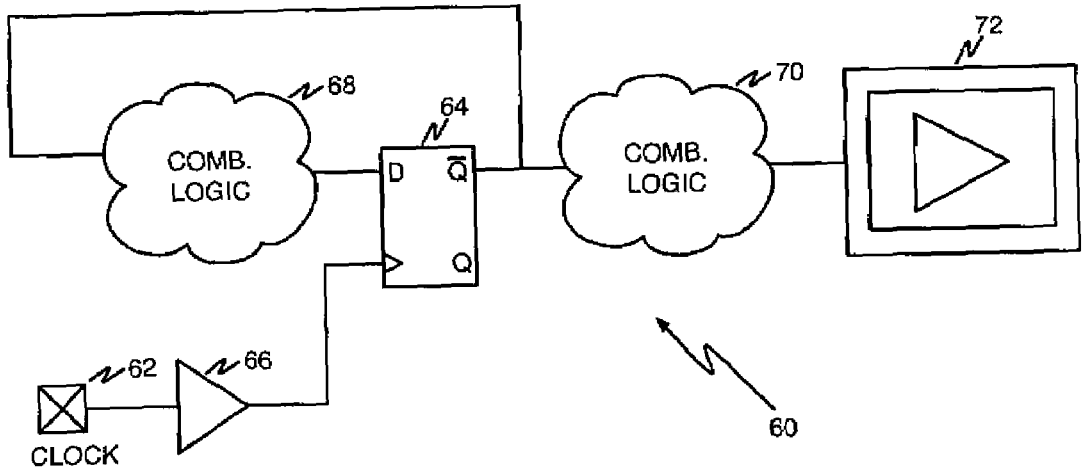
FIG. 2 is a block diagram of a typical generic peripheral device that may be employed in a microcontroller system.
Figure 3:
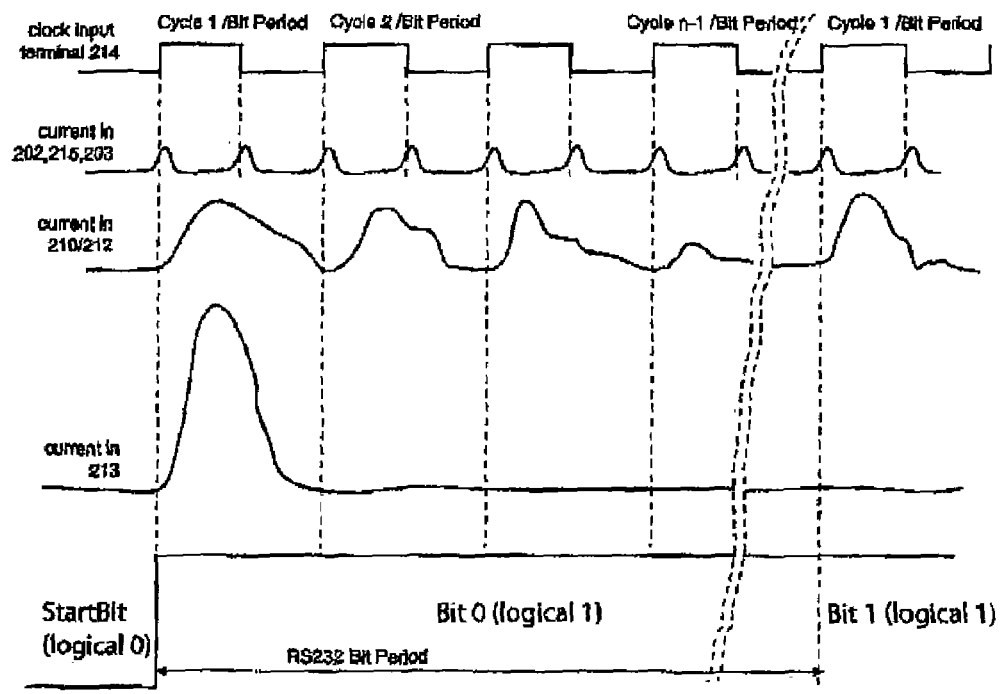
FIG. 3 is a set of waveforms showing typical current consumption in a peripheral device as a function of time.
Figure 4:
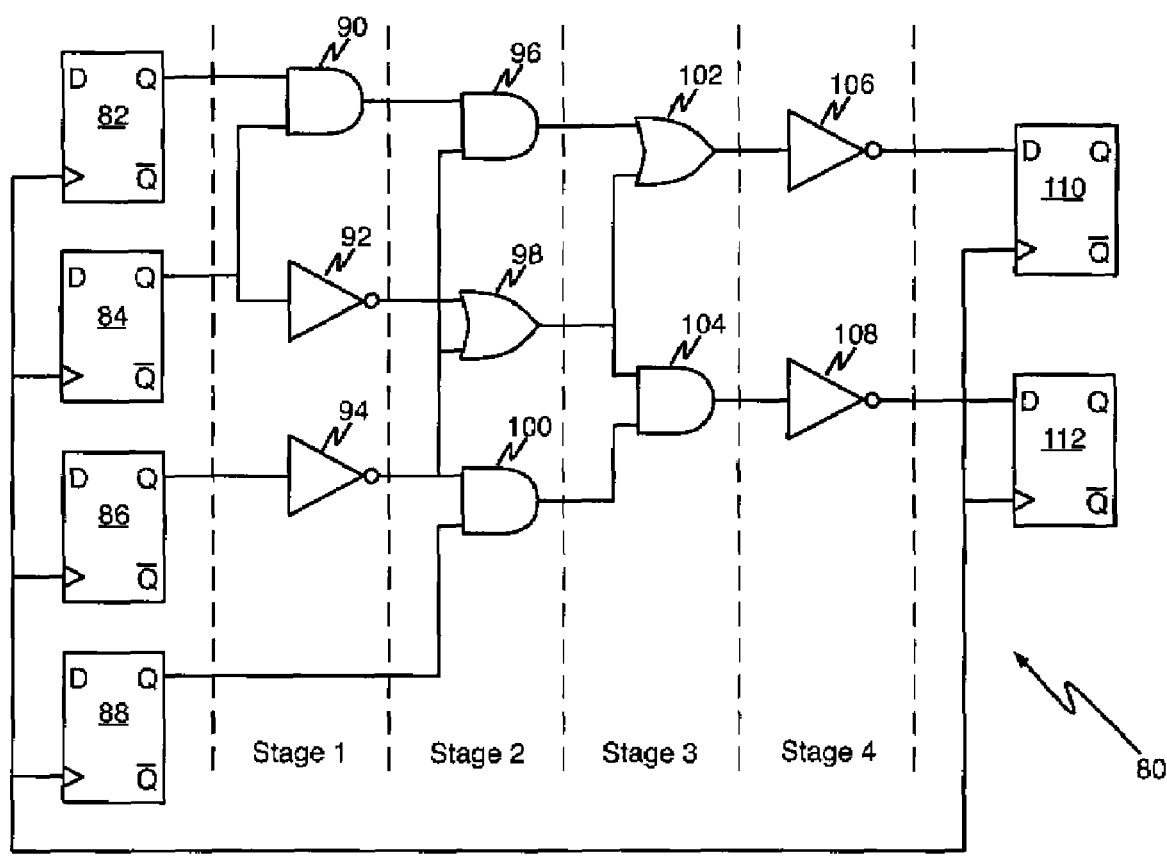
FIG. 4 is a schematic diagram of an example of a combinatorial logic structure.
Figure 5:
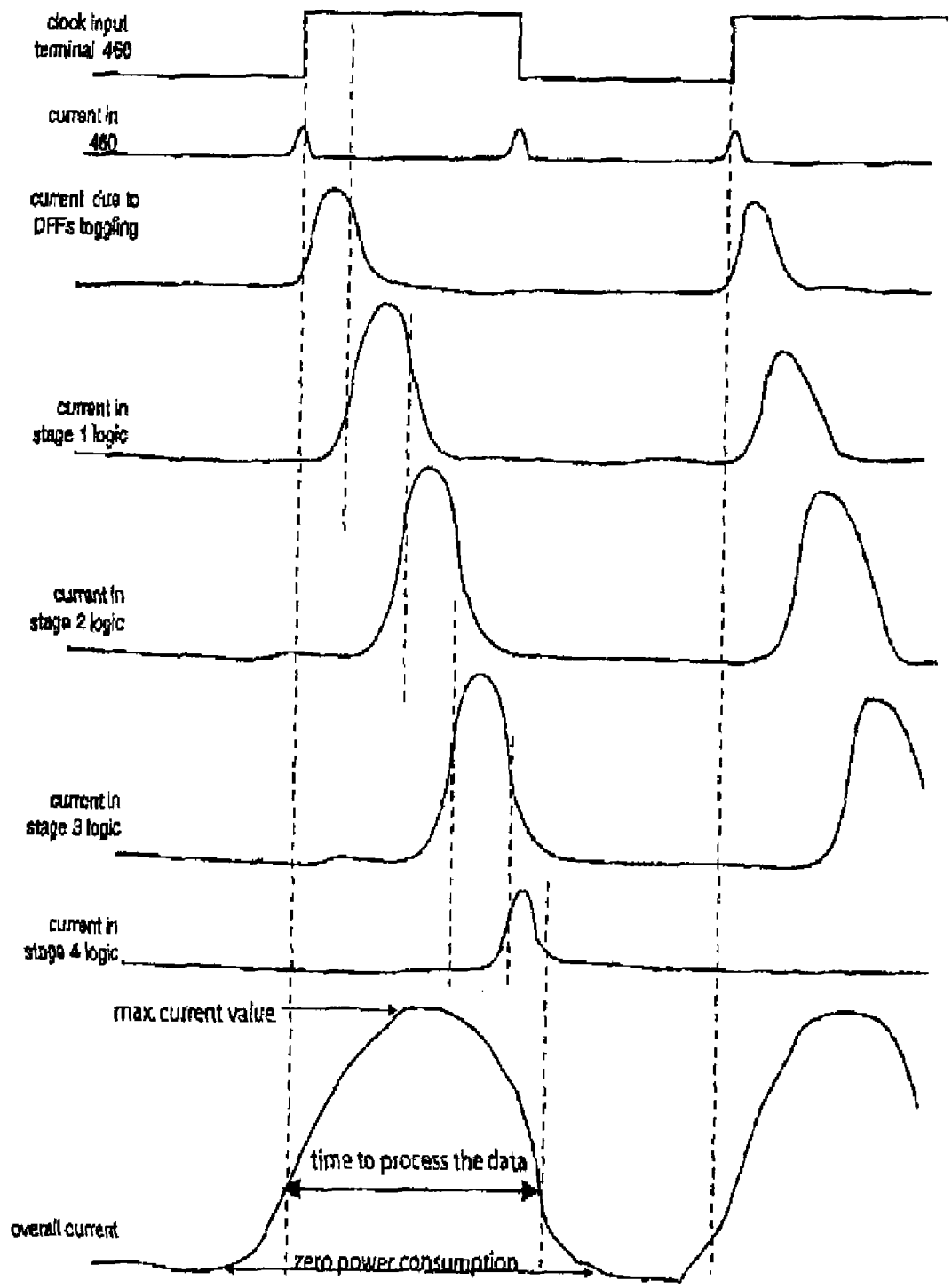
FIG. 5 is a set of waveforms showing typical current consumption in the combinatorial logic structure of FIG. 4.
Figure 9:
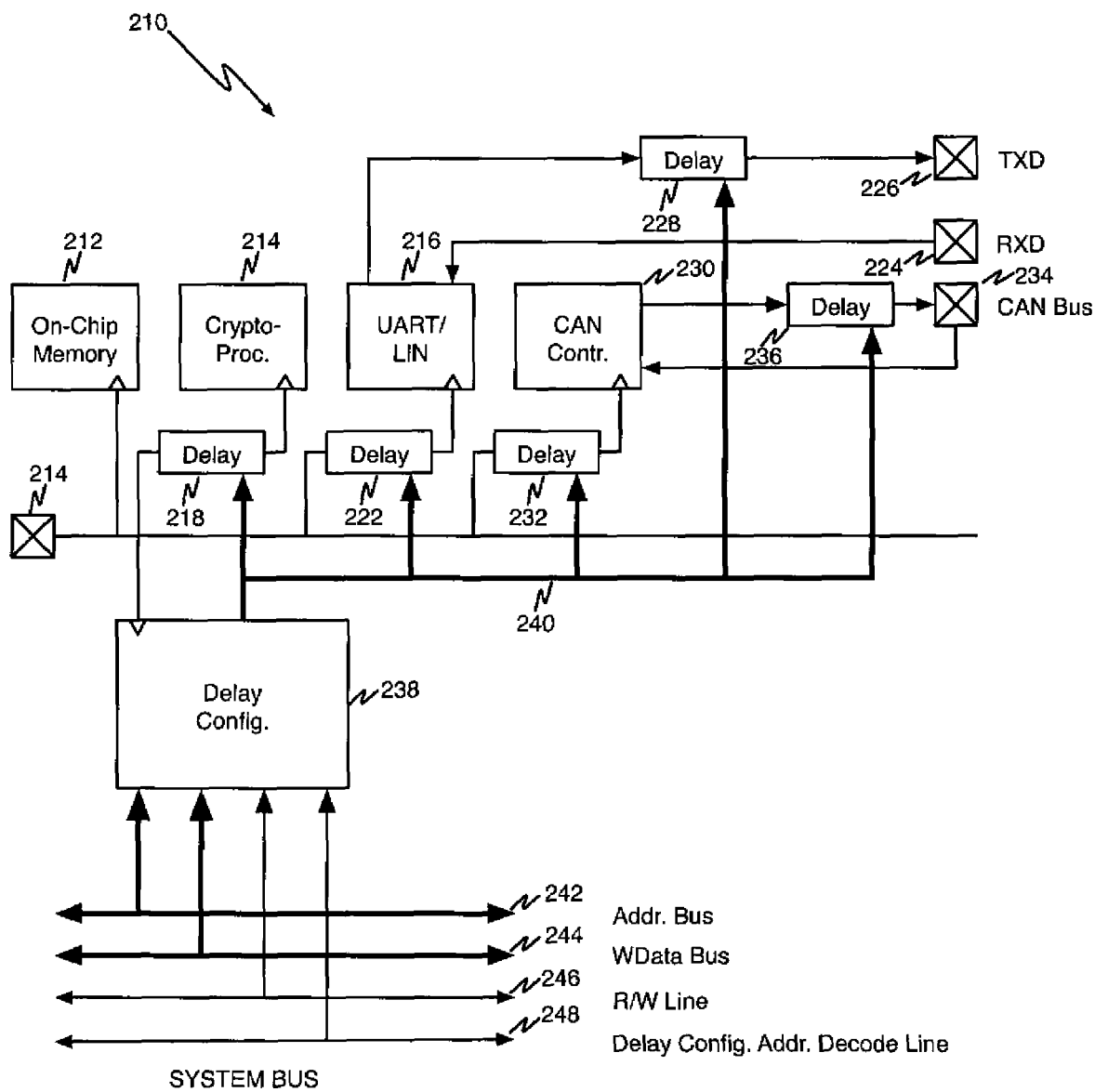
FIG. 9 is a block diagram illustrating the use of selectable programmable delays for different peripheral devices according to the present invention.

Referring now to FIG. 9, a portion 210 of a generic microcontroller system such as that depicted in FIG. 1 is shown. As in the microcontroller system depicted in FIG. 1, components include on-chip memory 212 coupled to clock input 214. Crypto-processor 216 is coupled to clock input 214 through programmable delay element 218. UART/LIN 220 is coupled to clock input 214 through programmable delay element 218 and has and RXD input 224 and TXD output 226 coupled through programmable delay element 228. CAN controller 230 is coupled to clock input 214 through programmable delay element 232 and is coupled to CAN Bus 234 through programmable delay element 236.

Delay configuration peripheral 238 has been added according to the present invention. Delay configuration peripheral 238 is coupled to clock input terminal 214 but may be coupled to any other clock means without departing from the scope of the invention. Delay configuration peripheral 238 contains enough storage elements to hold the configuration data needed to configure any programmable delay elements 218, 222, 228, 232, and 236. Delay configuration peripheral 238 is coupled to each of programmable delay elements 218, 222, 228, 232, and 236 to provide them with delay configuration data.

Delay configuration peripheral 238 is also accessible by the microprocessor of FIG. 1 and is therefore accessible by user software. Delay configuration peripheral 238 is accordingly shown coupled to the system bus, and thus is shown in FIG. 9 connected to the address bus 242, Wdata bus 244, R/W line 246, and delay configuration address decode line output 248 from the address decoder of FIG. 1 (not shown in FIG. 9).

By using the present invention, it is possible to optimize the EMC and/or current peak by measurement on final application (real life use) and act accordingly (tuning) on the programmable delays that will be accessible by software or any others means (input terminals, serial link, . . . ).

Synchronous logic theoretically needs a balanced clock to exchange data. To avoid the data exchange problem between each peripheral of the micro-controller when the clocks are slightly unbalanced, it is recommended that the maximum programmable delay be kept to about ¼ of the peripheral clock period (but lower than the clock period minus the setup time of DFF) and to insert a falling edge DFF between the output of any peripheral and the input of the peripheral receiving/sampling this signal. The signal is generated on the rising edge (DFF) of the said first peripheral and the receiving peripheral samples the falling edge generated signal on the rising edge of its clock. Such an embodiment of the present invention is shown with reference to FIG. 10, to which attention is now drawn.

Referring now to FIG. 10, a block diagram illustrates a data exchange architecture that may be employed in the present invention. The circuit of FIG. 10 shows two peripherals 250 and 252. Peripheral 250 has primary inputs 254 that drive combinatorial logic 256. The output of combinatorial logic 256 drives the data input of DFF 258. The output of DFF 258 is also fed back to combinatorial logic 256.

The clock input of DFF 258 is driven from a signal on clock input terminal 260 and delayed in programmable delay element 262 as already described herein. Buffer 264 represents a clock tree network. The output of DFF 258 is presented to the data input of DFF 266. DFF 266 is clocked by a falling edge as shown in FIG. 10.

Peripheral 252 has a data input node at the data input of DFF 268 that is fed by the output of DFF 266 in peripheral 250. The output of DFF 268 drives the primary inputs to combinatorial logic 270. The output of combinatorial logic 270 drives the data input of DFF 272. The output of DFF 272 is also fed back to combinatorial logic 270.

The clock input of both DFF 268 and DFF 272 are driven from a signal on clock input terminal 260 and delayed in programmable delay element 274 as already described herein. Buffer 276 represents a clock tree network. The output of DFF 272 is presented to the data input of DFF 266.

The use of a falling edge DFF 266 enables a correct data exchange from peripheral 250 to peripheral 252 whatever the operating conditions are and whatever the unbalanced delay configuration is used (assuming maximum delay is met). Peripheral 250 is clocked by the same clock source as peripheral 252. The arrival time of the clock edges at the clock pins of the DFFs 258 and 272 of the peripherals is slightly different because of clock skew. The clock skew is due to the different delays that are programmed into programmable delay elements 262 and 274 as previously described herein. The DFF 266 delays the signal at the output of DFF 258 by half the clock period, which is a time greater than the clock skew if it is limited to ¼ of the clock period. Therefore whatever the clock skew, the signal exchange is always the same.

Moreover, because the peripherals 250 and 252 may have a different number of DFFs (e.g., a UART is different from a SPI), the inherent clocktree latency is different as modeled by buffers 264 and 276. By using the architecture shown in FIG. 10, there is no more need to constraint the place and route to balance the clocks driving DFFs 258 and 272.

The falling edge DFF 266 inserted in the circuit will introduce a fixed delay of ½ clock period which will be greater than the maximum programmable delay of ¼ clock period, therefore whatever the derating factors are (process, voltage, temperature), the behavior of the overall logic remains the same.

If the peripherals do not exchange data with each other as in the case of a UART communicating with a ETHERNET MAC, there is nothing to add. In a micro-controller, the exchange can be from any peripheral to interrupt controller to provide the interrupt line and user interface (sub-module of any peripheral) to CPU or BRIDGE from the peripheral bus to the system bus to which the CPU is connected.

The present invention provides several advantages over the prior art. The peak current can be optimized or reduced according to the application (software/firmware) processed in the micro-controller. The peak current can also be optimized or reduced according to the clock frequency required by the application.

Use of the present invention provides the capability to improve the electromagnetic compatibly for an enlarged range of user applications because of the ability to introduce programmable delays in the internal clock architecture.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A system comprising:
   a central processing unit;
   a clock source;
   a set of peripheral units being accessible by the central processing unit, each peripheral unit in the set of peripherals having at least one data sequential logic element having a clock input coupled to the clock source and an output coupled to a data output node;
   a delay path including at least one programmable delay line coupled between the clock source and the clock input of the at least one data sequential logic element in at least one of the peripheral units, the at least one programmable delay line having a delay selection input, wherein; the at least one programmable delay line is formed having a plurality of unit delay elements, each unit delay element having a send input, a send output, a return input, a return output, an inverter coupled between the send input and the send output, a multiplexer having a first data input coupled to the send output, a second data input coupled to the return input, an inverting output coupled to the return output, and a select input, each successive unit delay element having its send input coupled to the send output of the preceding unit delay element and having its return output coupled to the return input of the preceding unit delay element; and
   the delay selection input includes one bit position for each select input of each multiplexer in each unit delay element.

2. The system of claim 1, disposed in an integrated circuit.

3. The system of claim 1 wherein the at least one data sequential logic element is a flip flop.

4. The system of claim 1 wherein the at least one data sequential logic element is a D flip flop.

5. The system of claim 1 wherein the delay selection input of the at least one programmable delay line being accessible by software running on the system.

6. The system of claim 1 wherein the delay selection input of the at least one programmable delay line being accessible from terminal inputs of the system.

7. The system of claim 1 wherein the at least one programmable delay line is formed from a series of inverters.

8. A system comprising:
   a central processing unit;
   a clock source;
   a set of peripheral units being accessible by the central processing unit, each peripheral unit in the set of peripherals having at least one data sequential logic element having a clock input coupled to the clock source and an output coupled to a data output node;
   a first delay path including at least one programmable delay line coupled between the output of the at least one data sequential logic element and the data output node in at least one of the peripheral units, the at least one programmable delay line having a delay selection input;
   a second delay path including a data-delay sequential logic element having a data input coupled to the output of the at least one data sequential logic element, a data output coupled to the data output node, and a clock input coupled to an inverted signal from the clock source; and
   delay selection means coupled between the first delay path, the second delay path, and the data output node, for selectively coupling the output of one of the first delay path and the second delay path to the data output node.

9. The system of claim 8, disposed in an integrated circuit.

10. The system of claim 8 wherein:
    the at least one data sequential logic element is a flip flop; and
    the at least one data-delay sequential logic element is a flip flop.

11. The system of claim 8 wherein:
    the at least one data sequential logic element is a D flip flop; and
    the at least one data-delay sequential logic element is a D flip flop.

12. The system of claim 8 wherein the delay selection input of the at least one programmable delay line is accessible by software running on the system.

13. The system of claim 8 wherein the delay selection input of the at least one programmable delay line is accessible from terminal inputs of the system.

14. The system of claim 8 wherein the at least one programmable delay line is formed from a series of inverters.

15. The system of claim 8 wherein;
the at least one programmable delay line is formed having a plurality of unit delay elements, each unit delay element having a send input, a send output, a return input, a return output, an inverter coupled between the send input and the send output, a multiplexer having a first data input coupled to the send output, a second data input coupled to the return input, an inverting output coupled to the return output, and a select input, each successive unit delay element having its send input coupled to the send output of the preceding unit delay element and having its return output coupled to the return input of the preceding unit delay element; and
the delay selection input includes one bit position for each select input of each multiplexer in each unit delay element 16. The system of claim of claim 8 wherein the delay selection means comprises a multiplexer.

* * * * *

UNITED STATES PATENT AND TRADEMARK OFFICE
CERTIFICATE OF CORRECTION

PATENT NO. : 7,669,072 B2  Page 1 of 1
APPLICATION NO. : 11/668978
DATED : February 23, 2010
INVENTOR(S) : Vergnes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Twenty-eighth Day of December, 2010

David J. Kappos
*Director of the United States Patent and Trademark Office*